US005777590A

United States Patent [19]

Saxena et al.

[11] Patent Number: 5,777,590

[45] Date of Patent: Jul. 7, 1998

[54] GRAYSCALE SHADING FOR LIQUID CRYSTAL DISPLAY PANELS

[75] Inventors: Nirmal R. Saxena, San Jose; Sridhar Manthani, Los Altos, both of Calif.

[73] Assignee: S3, Incorporated, Santa Clara, Calif.

[21] Appl. No.: 519,690

[22] Filed: Aug. 25, 1995

[51] Int. Cl.$^6$ .......... G06T 5/10

[52] U.S. Cl. .......... 345/89; 348/671

[58] Field of Search .......... 345/89, 148, 147, 345/88; 348/671

[56] References Cited

U.S. PATENT DOCUMENTS

| | | | |
|---|---|---|---|
| 4,827,255 | 5/1989 | Ishii | 340/793 |
| 5,122,783 | 6/1992 | Bassetti, Jr. | 345/88 |
| 5,185,602 | 2/1993 | Bassetti, Jr. et al. | 340/793 |
| 5,196,839 | 3/1993 | Johary et al. | 345/148 |
| 5,285,271 | 2/1994 | Gennetten | 358/500 |
| 5,293,159 | 3/1994 | Bassetti, Jr. et al. | 345/149 |
| 5,313,224 | 5/1994 | Singhal et al. | 345/89 |
| 5,321,418 | 6/1994 | Leroux | 345/89 |
| 5,485,173 | 1/1996 | Scheffer et al. | 345/100 |
| 5,488,387 | 1/1996 | Maeda et al. | 345/89 |
| 5,499,037 | 3/1996 | Nakagawa et al. | 345/89 |
| 5,521,727 | 5/1996 | Inaba et al. | 345/89 |
| 5,565,886 | 10/1996 | Gibson | 345/136 |

OTHER PUBLICATIONS

Nirmal R. Saxna et al., "Simple Bounds on Serial Signature Analysis Aliasing for Random Testing", IEEE Transactions on Electron Computers, vol. 41, No. 5, May 1992, pp. 638–645.

*Primary Examiner*—Mark R. Powell
*Attorney, Agent, or Firm*—Skjerven, Morrill, MacPherson, Franklin & Friel; Norman R. Klivans

[57] ABSTRACT

An LCD controller for use e.g. in a portable computer provides gray scale shading for both monochromatic and color displays using frame rate control modulation for intensity shading for each pixel. The gray scale shading process and circuit do not require any memory for storing phase tiling matrices or frame modulation pattern sequences; both of these instead are generated in real time using a linear matrix logic structure. Use of linear matrix operations also allows generation of various phase shifts of frame modulation pattern sequences to provide a better image on the display. In addition to providing programmable 4, 8, or 16 intensity levels, the present method and apparatus provide that vertically, horizontally or diagonally adjacent pixels on the display never have the same phase in the same frame, and in addition that the pixel display drivers are uniformly loaded.

11 Claims, 5 Drawing Sheets

| Mtrx | x8 | x7 | x6 | x5 | x4 | x3 | x2 | x1 | x0 | phs shift |
|---|---|---|---|---|---|---|---|---|---|---|
| G | q8,q7 | q6 | q5 | q4 | q3 | q2 | q1 | q8,q0 | q8 | 15 |
| $G^2$ | q8,q7<br>q6 | q5 | q4 | q3 | q2 | q1 | q8,q0 | q7 | q8,q7 | 14 |
| $G^3$ | q8,q7<br>q6,q5 | q4 | q3 | q2 | q1 | q8,q0 | q7 | q6 | q8,q7<br>q6 | 13 |
| $G^4$ | q8,q7<br>q6,q5<br>q4 | q3 | q2 | q1 | q8,q0 | q7 | q6 | q5 | q8,q7<br>q6,q5 | 12 |
| $G^5$ | q8,q7<br>q6,q5<br>q4,q3 | q2 | q1 | q8,q0 | q7 | q6 | q5 | q4 | q8,q7<br>q6,q5<br>q4 | 11 |
| $G^6$ | q8,q7<br>q6,q5<br>q4,q3<br>q2 | q1 | q8,q0 | q7 | q6 | q5 | q4 | q3 | q8,q7<br>q6,q5<br>q4,q3 | 10 |
| $G^7$ | q8,q7<br>q6,q5<br>q4,q3<br>q2,q1 | q8,q0 | q7 | q6 | q5 | q4 | q3 | q2 | q8,q7<br>q6,q5<br>q4,q3<br>q2 | 9 |
| $G^8$ | q7,q6<br>q5,q4<br>q3,q2<br>q1,q0 | q7 | q6 | q5 | q4 | q3 | q2 | q1 | q8,q7<br>q6,q5<br>q4,q3<br>q2,q1 | 8 |
| $G^9$ | q6,q5<br>q4,q3<br>q2,q1<br>q0 | q6 | q5 | q4 | q3 | q2 | q1 | q8,q0 | q7,q6<br>q5,q4<br>q3,q2<br>q1,q0 | 7 |
| $G^{10}$ | q5,q4<br>q3,q2<br>q1,q0 | q5 | q4 | q3 | q2 | q1 | q8,q0 | q7 | q6,q5<br>q4,q3<br>q2,q1<br>q0 | 6 |
| $G^{11}$ | q4,q3<br>q2,q1<br>q0 | q4 | q3 | q2 | q1 | q8,q0 | q7 | q6 | q5,q4<br>q3,q2<br>q1,q0 | 5 |
| $G^{12}$ | q3,q2<br>q1,q0 | q3 | q2 | q1 | q8,q0 | q7 | q6 | q5 | q4,q3<br>q2,q1<br>q0 | 4 |
| $G^{13}$ | q2,q1<br>q0 | q2 | q1 | q8,q0 | q7 | q6 | q5 | q4 | q3,q2<br>q1,q0 | 3 |
| $G^{14}$ | q1,q0 | q1 | q8,q0 | q7 | q6 | q5 | q4 | q3 | q2,q1<br>q0 | 2 |
| $G^{15}$ | q0 | q8,q0 | q7 | q6 | q5 | q4 | q3 | q2 | q1,q0 | 1 |
| $G^{16}$ | q8 | q7 | q6 | q5 | q4 | q3 | q2 | q1 | q0 | 0 |

FIG. 7

| Pattern | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| 0x001 | 0 | 1 | 1 | 0 | 1 | 0 | 0 | 1 | 1 | 0 | 1 | 1 | 0 | 1 | 0 | 0 | 1 |
| 0x002 | 0 | 0 | 0 | 0 | 0 | 1 | 1 | 1 | 0 | 0 | 0 | 0 | 1 | 1 | 1 | 1 | 1 |
| 0x004 | 0 | 0 | 0 | 1 | 0 | 0 | 0 | 0 | 1 | 1 | 1 | 1 | 1 | 0 | 1 | 1 | 1 |
| 0x008 | 0 | 0 | 0 | 0 | 0 | 0 | 0 | 0 | 0 | 1 | 1 | 1 | 1 | 1 | 1 | 1 | 1 |
| 0x010 | 0 | 0 | 0 | 0 | 0 | 1 | 1 | 1 | 1 | 0 | 0 | 0 | 1 | 1 | 1 | 1 | 1 |
| 0x020 | 0 | 0 | 0 | 0 | 1 | 0 | 0 | 0 | 0 | 1 | 1 | 1 | 0 | 1 | 1 | 1 | 1 |
| 0x040 | 0 | 0 | 0 | 1 | 0 | 0 | 0 | 0 | 0 | 1 | 1 | 1 | 1 | 0 | 1 | 1 | 1 |
| 0x080 | 0 | 0 | 0 | 0 | 0 | 1 | 1 | 1 | 1 | 0 | 0 | 1 | 1 | 1 | 1 | 1 | 1 |
| 0x100 | 0 | 0 | 0 | 0 | 0 | 0 | 1 | 0 | 0 | 1 | 1 | 1 | 1 | 1 | 1 | 1 | 1 |
| 0x103 | 0 | 0 | 1 | 0 | 0 | 0 | 0 | 1 | 1 | 0 | 0 | 1 | 1 | 1 | 0 | 1 | 1 |
| 0x105 | 0 | 0 | 0 | 0 | 1 | 0 | 1 | 0 | 0 | 1 | 1 | 0 | 0 | 1 | 1 | 1 | 1 |
| 0x109 | 0 | 0 | 0 | 0 | 0 | 1 | 0 | 1 | 1 | 0 | 0 | 0 | 1 | 1 | 1 | 1 | 1 |
| 0x111 | 0 | 0 | 0 | 0 | 0 | 0 | 0 | 0 | 0 | 1 | 1 | 1 | 1 | 1 | 1 | 1 | 1 |
| 0x121 | 0 | 0 | 0 | 0 | 0 | 1 | 0 | 1 | 1 | 0 | 0 | 0 | 1 | 1 | 1 | 1 | 1 |
| 0x141 | 0 | 0 | 0 | 1 | 0 | 0 | 1 | 0 | 1 | 1 | 1 | 1 | 1 | 0 | 1 | 1 | 1 |
| 0x181 | 0 | 0 | 0 | 0 | 1 | 0 | 0 | 0 | 0 | 1 | 1 | 1 | 0 | 1 | 1 | 1 | 1 |

FIG. 8

GRAYSCALE SHADING FOR LIQUID CRYSTAL DISPLAY PANELS

BACKGROUND OF THE INVENTION

1. Field of the Invention

This invention relates to a controller for a computer display and more specifically to a controller including gray scale shading for liquid crystal (flat panel type) computer displays.

2. Description of the Prior Art

Portable computers typically include what is called generically a flat panel display. These come in many types; typical are liquid crystal displays. Liquid crystal displays include active matrix type which are also called TFT (thin film transistor) type and passive matrix type which are also called STN (super twisted nematic) type. Both of these are available in monochromatic and color versions. Such flat panel displays are driven by a controller which is typically a portion of an integrated circuit chip and also is referred to as a display controller or an LCD controller. These displays have a number of well known characteristics which must be overcome by the associated controller. One characteristic is that if the various display pixels (picture elements) are excited so that adjacent picture elements are excited in the same phase, undesirable visual artifacts appear, degrading the quality of the resulting image. These artifacts include visual crosstalk, flickering, and a streaming motion. It is well known to introduce some sort of a phase shift for excitation of adjacent pixels in certain types of LCD controllers. It is also desirable that the pixel drivers in the LCD panel be uniformly loaded.

Bassetti, Jr. et al., U.S. Pat. No. 5,185,602 issued Feb. 9, 1993 entitled "Method and Apparatus for Producing Perception of High Quality Gray Scale Shading on Digitally Commanded Displays" and incorporated herein by reference deals with some of these deficiencies by requiring storage of various phase shifted patterns for pixel excitation. Bassetti, Jr. et al. also uses modulo-D operations on row and column counters to effect tiling pattern selection for phase shifting. Ishii, U.S. Pat. No. 4,827,255 issued May 2, 1989 entitled "Display Control System which Produces Varying Patterns to Reduce Flickering" similarly requires storage of various phase shifted patterns.

Hence the prior art, while overcoming the problems associated with e.g. LCD displays, requires the presence of substantial memory (for instance RAM or ROM) for storage of the phase shifting patterns and uses a method for tiling pattern selection which is difficult to implement in certain versions, due to requiring large amounts of logic circuitry. Hence prior art solutions are relatively expensive in terms of chip surface area requiring both substantial amounts of logic circuitry as well as dedicated memory circuitry. It would be desirable to have a flat panel display controller which is more economically fabricated, thereby reducing overall system cost, and which also consumes less power.

SUMMARY OF THE INVENTION

In accordance with the invention, a flat panel display controller provides the needed phase shift patterns without requiring any dedicated memory for storage of phase shifted patterns, by instead deriving the patterns in real time by logic circuitry implementing matrix multiplication. Additionally, no modulo operations are required because instead the tiling patterns are generated by the logic circuitry, while maintaining full programmability for adaptation with various types of displays. Advantageously the chip gate count, which corresponds to chip surface area, in accordance with the present invention in one embodiment is believed to be about one third to one quarter of the prior art solutions thereby conserving power and also reducing chip cost. In accordance with the invention, gray scale shading is provided for digitally controlled liquid crystal or other types of flat panel displays. In this disclosure "liquid crystal display" refers generically to all such displays including monochromatic and color; gray scale for a color display refers to the color intensity, i.e. light level, of any particular pixel without regard to the particular color being displayed.

A process in accordance with the present invention supports various level intensity shadings using a frame rate control scheme and ensures that the pixel drivers in the display have balanced loading. (Balanced loading refers to maximizing the distance between simultaneously energized pixels to spread the load on the row and column pixel drivers.) Balanced loading is achieved by the mathematical properties of the frame control pixel excitation sequences. Additionally it is ensured that pixels having the same phase are not vertically, horizontally, or diagonally adjacent, thus improving color crispness (or monochromatic crispness) and eliminating other visual artifacts. In accordance with the invention both phase tiling and frame modulation pattern sequences are generated in real time using logic circuitry which implements linear matrix calculations.

BRIEF DESCRIPTION OF THE DRAWINGS

FIG. 7 is a table illustrating in tabular form a nine by nine matrix multiplication logic circuit having inputs 80 through 88 and outputs of X8 through X0.

FIG. 8 shows a table for logic for weight decoder selection from pattern values.

DETAILED DESCRIPTION OF THE PREFERRED EMBODIMENTS

Both a method to produce grayscale shading on a digitally controlled liquid crystal display panel and a circuit to implement the method support 4, 8, and 16 level intensity shading using frame rate control (FRC); ensure that the pixel drivers in the LCD panel have balanced loading; ensure that pixel points in the same phase not be vertically, horizontally, or diagonally adjacent; and eliminate visual artifacts.

It is to be understood that the presently disclosed process and circuit are a portion of an otherwise conventional display controller, the other portions of which are not described herein.

Figure 1:
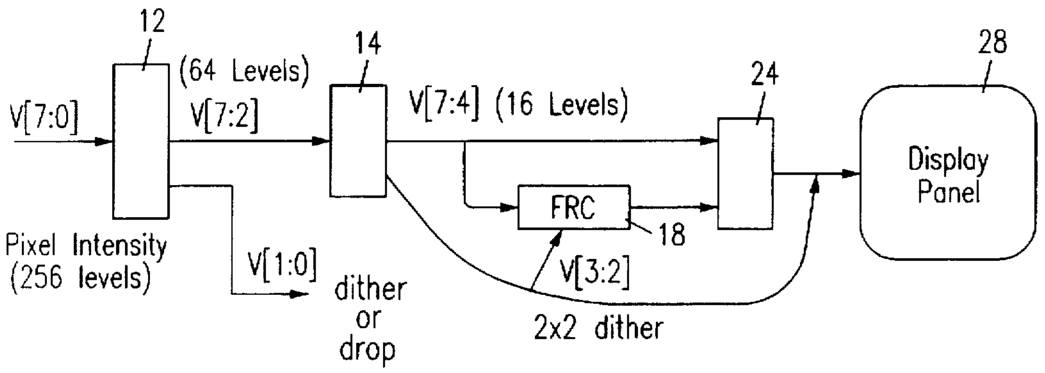
FIG. 1 illustrates frame rate control for gray scale shading in accordance with the present invention.

FIG. 1 shows a circuit for programmable 4, 8, and 16 level FRC gray scale shading. The present gray scale shading process as shown in FIG. 1 is novel in that it does not require any memory (RAM or ROM) for storing phase tiling matrices or frame modulation pattern sequences. Both phase tiling and frame modulation pattern sequences are generated in accordance with the invention during run-time (i.e., in real time) using linear matrix logic structures. The use of linear matrix operations also allows easy generation of various phase shifts for frame modulation pattern sequences. These linear matrix logic structures are easy to implement (use a minimal number of logic gates) and allow easy programmability for use with various different types of displays. In addition to providing programmable 4, 8, 16 intensity levels, the present method and circuit guarantee (with the exception of the 4 level implementation) that vertically, horizontally, or diagonally adjacent pixels never have the same phase in the same frame, and that the pixel drivers in the LCD panel are uniformly loaded by distributing the phases over adjacent pixels. This improves image quality.

FIG. 1 shows how 16-level FRC modulation is used for eight-bit encoded 256 level pixel intensity. FRC modulation is described in detail in Bassetti, Jr. U.S. Pat. No. 5,185,602. The four least significant bits V[3:0] in the eight-bit encoding input signal V[7:0] could be dropped by selector 12 (as shown for V[1:0]) or used as shown for V[3:2] for pixel dithering conventionally (not the subject of this disclosure). The four most significant bits V[7:4] are delivered from selector 14 to the FRC modulation block 18 to simulate the effect of 16 levels on the LCD display panel. Dithering here is applied to those pixels not used by the FRC process to increase the number of colors. The effect of multiple gray levels is obtained in FRC through the on-off time modulation of display panel interface 24 which conventionally drives the display panel 28. The fraction of time each pixel is on (duty cycle) during a frame period conventionally accomplishes the effect of a fractional gray level between the minimum (black) and maximum (white) pixel intensities. Since the on-off control in digitally commanded display 28 is in discrete units, the fractional gray levels accomplished thereby are also discrete. In general, using a period n pattern sequence up to n+1 gray levels can be obtained through time modulation.

This disclosure is of 16, 8 and 4 level FRC as exemplary implementations to illustrate the present FRC method. The scope of this invention, however, is not limited to these levels; other conceivable gray scale levels can also realized using this process and a suitably modified version of the presently disclosed circuit.

Figure 2:
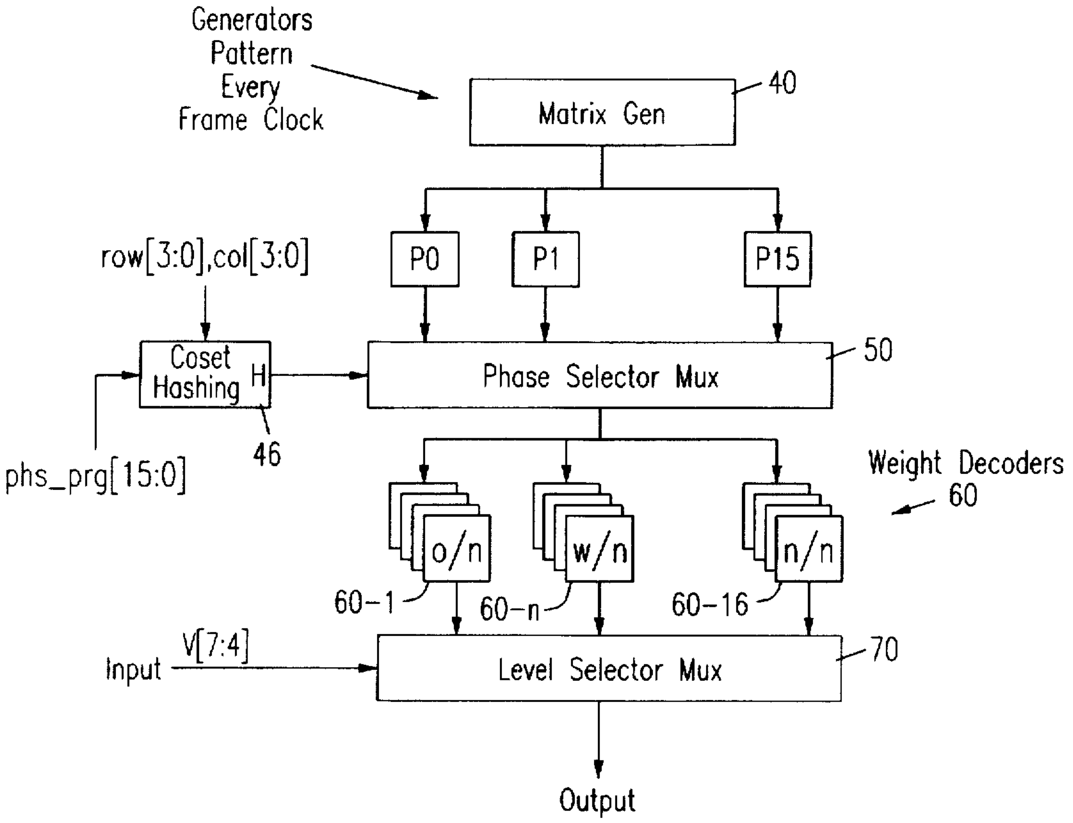
FIG. 2 illustrates in a block diagram a circuit for accomplishing frame rate control in accordance with the present invention.

The circuit of FIG. 2 illustrates the implementation of 16 gray levels using FRC. The pixel data input V[7:4] is a 4-bit encoded pixel intensity corresponding to a particular row and column of display 28 of FIG. 1. These four bits encode 16 gray levels. At the output to display 28 of FIG. 1, a time modulated length n sequence of ones and zeroes is generated corresponding to the 4-bit encoding. This output sequence drives the pixel drivers 24 for the display 28. A value of one turns the pixel driver ON and a value of zero turns the pixel driver OFF. The length n pattern sequence is derived by using n frames in a modulation period. To realize 16 gray levels, n must be at least 15. Matrix generator 40 of FIG. 2 produces a length n periodic sequence of distinct k-bit vectors. In order for n to be at least 15, k must be at least 4.

Produced at the outputs of blocks P0 through P15 are phase shifts, 0 through 15 respectively, of the pattern sequence generated by the matrix generator 40. The coset hashing block 46, controlling the phase selector multiplexer 50, selects a particular phase shift of the pattern sequence for each pixel. The selection procedure guarantees that no two adjacent pixels (horizontal, vertical, and diagonal) are driven by sequence with the same phase shift. The 16 weight decoders 60 (one decoder per phase) convert the phase shifted pattern sequence to a single output sequence. For example, the weight decoder 60-n (labelled w/n) generates an output sequence with w one and n-w zeroes. Weight decoders 60-1 and 60-16 (labelled 0/n and n/n) will always output zero and one respectively. For a given pixel intensity (encoded by V[7:4]) the level sector multiplexer 70 selects one of the 16 weight decoder 60 outputs. Since it is possible for n+1 to be greater than 16, some of the weight decoder 60 outputs have to be dropped. However, all zero (level 0/n) and all one (level n/n) outputs must be preserved to realize the minimum and maximum gray levels.

The following describes detail of the elements in FIG. 2. Periodic patterns can be generated using matrix multiplication feedback. The following shows an arrangement for a 4 bit length 15 periodic pattern sequence to be carried out by matrix generator 40 of FIG. 2:

| Patterns |
|---|
| 0001 |
| 0111 |
| 1010 |
| 0011 |
| 0110 |
| 1101 |
| 1001 |
| 0101 |
| 1011 |
| 0100 |
| 1100 |
| 1110 |
| 1111 |
| 1000 |
| 0010 |

The matrix generator includes a k-bit register with inputs labelled d[k−1:0] and outputs labelled q[k−1:0]. The feed back function takes vector q[k−1:0] as an input and performs a linear matrix multiplication in Galois field and produces output d[k−1:0] that is fed back to the k-bit register, as shown on matrix algebra form by:

$$\begin{bmatrix} d3 \\ d2 \\ d1 \\ d0 \end{bmatrix} = \begin{bmatrix} 0100 \\ 0101 \\ 1001 \\ 0011 \end{bmatrix} \begin{bmatrix} q3 \\ q2 \\ q1 \\ q0 \end{bmatrix}$$

Figure 3:
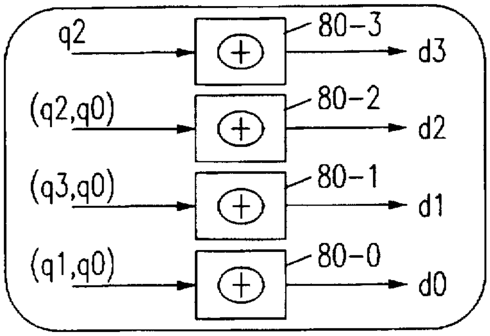
FIG. 3 shows diagrammatically a logic circuit for pattern generation using linear matrix feedback.

This example as implemented by a logic circuit shown schematically in FIG. 3 which uses k=4 for illustration, where the blocks 80 each indicate a logical exclusive OR operation (Ex-OR gate) corresponding to the matrix multiplication d[k−1:0]=matrix×q[k−1:0]. The k-bit register is clocked by the frame clock signal. The period properties of these matrices relate to the cycle properties of their characteristic polynomials. See N. Saxena et al., "Simple Bounds on Signature Analysis Aliasing for Random Testing", *IEEE Transactions on Computers*, May 1992, incorporated herein by reference.

The advantages of using such matrix-based pattern generation are:

(1) There are several matrix based implementations that generate a particular period sequence.

(2) The pattern generation procedure can be programmable.

(3) It does not require pattern memory (ROM or RAM) to reproduce periodic sequences.

(4) It is simpler in implementation (gate count) compared to other binary counter-based pattern generators.

(5) It allows natural phase shift properties using matrix multiplication.

Figure 4:
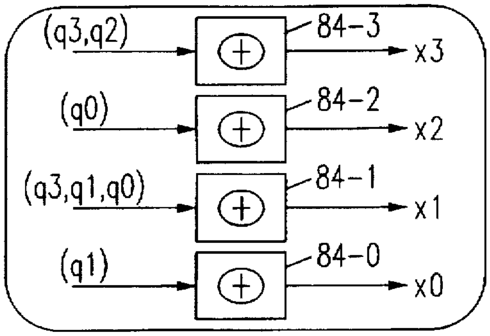
FIG. 4 shows diagrammatically a logic circuit for phase shifted pattern sequencing using linear matrix multiplication.

Phase shift through matrix multiplication is the most important property of the matrix based pattern generator. FIG. 4 illustrates schematically a logic circuit for accomplishing this phase shift (using the same notation as that of FIG. 3) and including Ex-OR gates 84. The logic circuit represented by FIG. 4 carries out the following matrix multiplication:

$$\begin{bmatrix} x3 \\ x2 \\ x1 \\ x0 \end{bmatrix} = \begin{bmatrix} 1100 \\ 0001 \\ 1011 \\ 0010 \end{bmatrix} \begin{bmatrix} q3 \\ q2 \\ q1 \\ q0 \end{bmatrix}$$

The phase shifted sequence pattern carried out by FIG. 4 and by the above matrix multiplication is also illustrated by the following pattern showing relative values of q and x:

| Q | X |
|---|---|
| 0001 | 0110 |
| 0111 | 1101 |
| 1010 | 1001 |
| 0011 | 0101 |
| 0110 | 1011 |
| 1101 | 0100 |
| 1001 | 1100 |
| 0101 | 1110 |
| 1011 | 1111 |
| 0100 | 1000 |
| 1100 | 0010 |
| 1110 | 0001 |
| 1111 | 0111 |
| 1000 | 1010 |
| 0010 | 0011 |

As shown in the above pattern, the values of Q are identical to the value of X occurring four entries above (earlier) in the X column. This illustrates the desired phase shift. That is, columns Q and column X are identical except that column X is shifted forward four entries in time relative to the entries in column Q.

Figure 5:
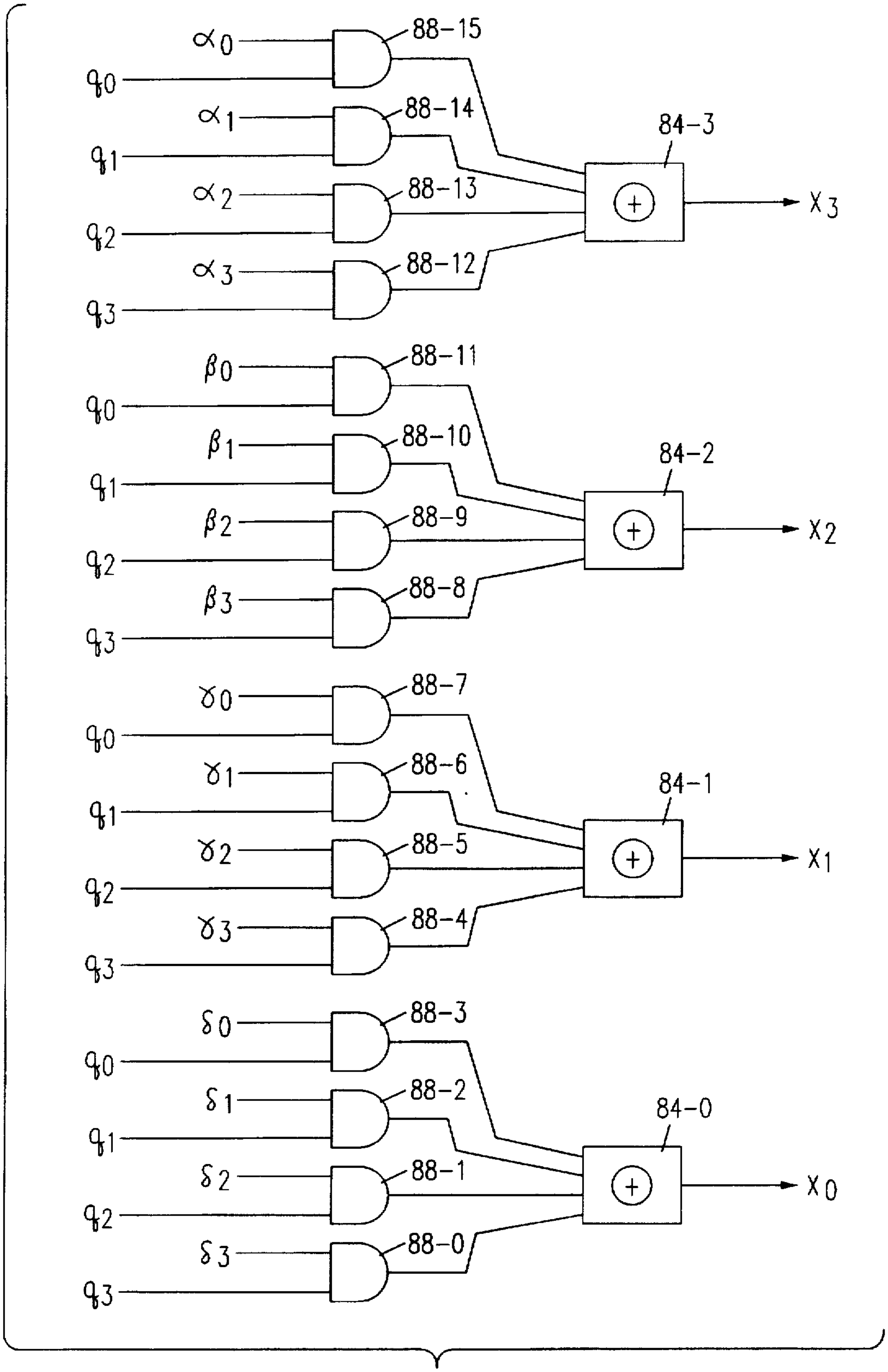
FIG. 5 illustrates schematically a programmable version of the logic circuit of FIG. 4 including a number of four input exclusive OR gates.

FIG. 5 schematically illustrates in more detail logic circuitry which is programmable and otherwise corresponds to that of FIG. 4. The four input exclusive OR (EX-OR) gates 84-0, . . . , 84-3 of FIGS. 4 and 5 each produce one value of X.

Figure 6:
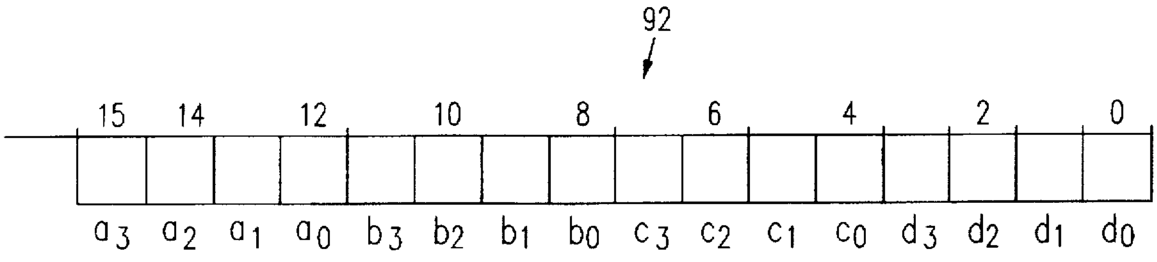
FIG. 6 shows a programmable register for providing input values to the logic circuit of FIG. 5.

Each of the four input exclusive OR gates 84-0, . . . , 84-3 is provided as an input with each of the values q0, q1, q2, q3 of Q in this embodiment in order to provide the desired programmability. Each value of Q is logically combined by an AND gate 88-0, . . . , 88-15 with a second value here expressed as α, β, γ, and δ. These sixteen α, β, γ, and δ values thus include 16 logical values each being (logical 1 or logical 0) which provide the desired selection amongst the values of Q to supply each exclusive OR gate. Thus this logic circuitry is rendered programmable by setting a 16 bit register 92 as illustrated in FIG. 6 to supply each of the values for α, β, γ, and δ. Programmable register 92 thus allows any four by four matrix to be selected. This programmability allows tuning for particular displays. Thus setting the programmable register 92 of FIG. 6 to various values allows adaptation to various displays.

The following portion of this disclosure is directed to generating various phase shifts using matrix multiplication. For purposes of illustration, a period 16 pattern sequence (generated by a 9-bit register using 9×9 matrix multiplication feedback) is used. Using matrix G where:

| G = |
|---|
| 110000000 |
| 001000000 |
| 000100000 |
| 000010000 |
| 000001000 |
| 000000100 |
| 000000010 |
| 100000001 |
| 100000000 |

The following period 16 pattern sequence is generated. This sequence is used for the entire illustration herein of the FRC implementation:

| Q |
|---|
| 000000001 -> 0 × 001 |
| 000000010 -> 0 × 002 |
| 000000100 -> 0 × 004 |
| 000001000 -> 0 × 008 |
| 000010000 -> 0 × 010 |
| 000100000 -> 0 × 020 |
| 001000000 -> 0 × 040 |
| 010000000 -> 0 × 080 |
| 100000000 -> 0 × 100 |
| 100000011 -> 0 × 103 |
| 100000101 -> 0 × 105 |
| 100001001 -> 0 × 109 |
| 100010001 -> 0 × 111 |
| 100100001 -> 0 × 121 |
| 101000001 -> 0 × 141 |
| 110000001 -> 0 × 181 |

To accomplish a phase shift of p, the pattern sequence must be multiplied by matrix power $G^{n-p}$.

The following sequence (phase shifted by one) is obtained by multiplying the foregoing sequence by $G^{15}$:

| |
|---|
| 110000001 -> 0 × 181 |
| 000000001 -> 0 × 001 |
| 000000010 -> 0 × 002 |
| 000000100 -> 0 × 004 |
| 000001000 -> 0 × 008 |
| 000010000 -> 0 × 010 |
| 000100000 -> 0 × 020 |
| 001000000 -> 0 × 040 |
| 010000000 -> 0 × 080 |
| 100000000 -> 0 × 100 |
| 100000011 -> 0 × 103 |
| 100000101 -> 0 × 105 |
| 100001001 -> 0 × 109 |
| 100010001 -> 0 × 111 |
| 100100001 -> 0 × 121 |
| 101000001 -> 0 × 141 |

The following are all of the non-trivial powers of G:

| $G^2$ = |
|---|
| 111000000 |
| 000100000 |
| 000010000 |
| 000001000 |
| 000000100 |

-continued

| |
|---|
| 000000010 |
| 100000001 |
| 010000000 |
| 110000000 |
| $G^3$ = |
| 111100000 |
| 000010000 |
| 000001000 |
| 000000100 |
| 000000010 |
| 100000001 |
| 010000000 |
| 001000000 |
| 111000000 |
| $G^4$ = |
| 111110000 |
| 000001000 |
| 000000100 |
| 000000010 |
| 100000001 |
| 010000000 |
| 001000000 |
| 000100000 |
| 111100000 |
| $G^5$ = |
| 111111000 |
| 000000100 |
| 000000010 |
| 100000001 |
| 010000000 |
| 001000000 |
| 000100000 |
| 000010000 |
| 111110000 |
| $G^6$ = |
| 111111100 |
| 000000010 |
| 100000001 |
| 010000000 |
| 001000000 |
| 000100000 |
| 000010000 |
| 000001000 |
| 111111000 |
| $G^7$ = |
| 111111110 |
| 100000001 |
| 010000000 |
| 001000000 |
| 000100000 |
| 000010000 |
| 000001000 |
| 000000100 |
| 111111100 |
| $G^8$ = |
| 011111111 |
| 010000000 |
| 001000000 |
| 000100000 |
| 000010000 |
| 000001000 |
| 000000100 |
| 000000010 |
| 111111110 |
| $G^9$ = |
| 001111111 |
| 001000000 |
| 000100000 |
| 000010000 |
| 000001000 |
| 000000100 |
| 000000010 |
| 100000001 |
| 011111111 |
| $G^{10}$ = |
| 000111111 |
| 000100000 |
| 000010000 |
| 000001000 |
| 000000100 |

-continued

| |
|---|
| 000000010 |
| 100000001 |
| 010000000 |
| 001111111 |
| $G^{11}$ = |
| 000011111 |
| 000010000 |
| 000001000 |
| 000000100 |
| 000000010 |
| 100000001 |
| 010000000 |
| 001000000 |
| 000111111 |
| $G^{12}$ = |
| 000001111 |
| 000001000 |
| 000000100 |
| 000000010 |
| 100000001 |
| 010000000 |
| 001000000 |
| 000100000 |
| 000011111 |
| $G^{13}$ = |
| 000000111 |
| 000000100 |
| 000000010 |
| 100000001 |
| 010000000 |
| 001000000 |
| 000100000 |
| 000010000 |
| 000001111 |
| $G^{14}$ = |
| 000000011 |
| 000000010 |
| 100000001 |
| 010000000 |
| 001000000 |
| 000100000 |
| 000010000 |
| 000001000 |
| 000000111 |
| $G^{15}$ = |
| 000000001 |
| 100000001 |
| 010000000 |
| 001000000 |
| 000100000 |
| 000010000 |
| 000001000 |
| 000000100 |
| 000000011 |
| $G^{16}$ = |
| 100000000 |
| 010000000 |
| 001000000 |
| 000100000 |
| 000010000 |
| 000001000 |
| 000000010 |
| 000000001 |

$G^{16}$ is the identity matrix because the period of G is 16. FIG. 7 illustrates in a table a logic circuit implementation of these matrix powers. Columns x8 to x0 of FIG. 7 represent the output of one of the phase shift blocks of FIG. 2 (P0 through P15). Each row of FIG. 7 corresponds to a particular phase shift. The cell entries in the table of FIG. 7 represent the input literals (subset of q8 through q0) to be logically combined by an exclusive OR gate (or equivalent logic) to produce a particular x output in the selected column x8 thru x0.

A logic circuit which meets the requirements as described by the table of FIG. 7 would be implemented as discussed above and as shown in FIG. 5, using Ex-OR and AND gates, except that here there are nine EX-OR gates (for x0 to x8) each having nine inputs (for q0, . . . , q8), i.e. there is more complexity than that shown in FIG. 5 but the overall structure would be similar. However as can be seen, there is considerable repetition in the table of FIG. 7. For instance if one follows a diagonal from the upper right to the lower left one can see that each diagonal includes the exact same values of Q. Thus the logic described by the table of FIG. 7 may be implemented by a relatively small number of logic gates.

The phase selection vector p3 through p0 that selects one of the 16 phase shifts to drive coset hashing block 46 of FIG. 2 is derived from:

(1) Least significant 4 bits of the row counter (r3–r0);

(2) Least significant 4 bits of the column counter (c3–c0); and (3) a 4×4 matrix, H, called herein the coset-hash tiling matrix. (The row and column counters are those conventionally present in the display controller.)

Mathematically, the phase shift vector is p[3:0]=H×r[3:0] +c[3:0] where 'x' is the matrix multiplication operation in Galois field and '+' is a modulo-2 vector addition operation. The matrix H is selected by a search procedure that ensures that no two adjacent pixels have the same phase shift (there are at least 4000 such 4×4 matrices). The following table illustrates a coset hashing circuit 46 of FIG. 2 for generating some phase tiling matrices. It has been found that matrices H which have low periods produce stable grayscale patterns on standard LCD's. (The blank portions of this table are not used.)

Coset Hash Phase (p3–p0)
tiling Implementation
Inputs: Levels, r3–r0, c3–c0

| Levels | p3 | p2 | p1 | p0 |
|---|---|---|---|---|
| 4 | r0, c | r1, c0 | | |
| 8 | r0, c2 | r1, r0, c1 | r2, c0 | |
| 16 | r0, c3 | r1, c2 | r2, r0, c1 | r3, c0 |

The following illustrations show the phase tiling patterns obtained by the implementation described in this coset hashing table:

Phase Tiling Using Coset Hash Tiling for 16 Levels

| | | | | | | | | | | | | | | | |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |
| 10 | 11 | 8 | 9 | 14 | 15 | 12 | 13 | 2 | 3 | 0 | 1 | 6 | 7 | 4 | 5 |
| 4 | 5 | 6 | 7 | 0 | 1 | 2 | 3 | 12 | 13 | 14 | 15 | 8 | 9 | 10 | 11 |
| 14 | 15 | 12 | 13 | 10 | 11 | 8 | 9 | 6 | 7 | 4 | 5 | 2 | 3 | 0 | 1 |
| 2 | 3 | 0 | 1 | 6 | 7 | 4 | 5 | 10 | 11 | 8 | 9 | 14 | 15 | 12 | 13 |
| 8 | 9 | 10 | 11 | 12 | 13 | 14 | 15 | 0 | 1 | 2 | 3 | 4 | 5 | 6 | 7 |
| 6 | 7 | 4 | 5 | 2 | 3 | 0 | 1 | 14 | 15 | 12 | 13 | 10 | 11 | 8 | 9 |
| 12 | 13 | 14 | 15 | 8 | 9 | 10 | 11 | 4 | 5 | 6 | 7 | 0 | 1 | 2 | 3 |
| 1 | 0 | 3 | 2 | 5 | 4 | 7 | 6 | 9 | 8 | 11 | 10 | 13 | 12 | 15 | 14 |
| 11 | 10 | 9 | 8 | 15 | 14 | 13 | 12 | 3 | 2 | 1 | 0 | 7 | 6 | 5 | 4 |
| 5 | 4 | 7 | 6 | 1 | 0 | 3 | 2 | 13 | 12 | 15 | 14 | 9 | 8 | 11 | 10 |
| 15 | 14 | 13 | 12 | 11 | 10 | 9 | 8 | 7 | 6 | 5 | 4 | 3 | 2 | 1 | 0 |
| 3 | 2 | 1 | 0 | 7 | 6 | 8 | 4 | 11 | 10 | 9 | 8 | 15 | 14 | 13 | 12 |
| 9 | 8 | 11 | 10 | 13 | 12 | 15 | 14 | 1 | 0 | 3 | 2 | 5 | 4 | 7 | 6 |
| 7 | 6 | 5 | 4 | 3 | 2 | 1 | 0 | 15 | 14 | 13 | 12 | 11 | 10 | 9 | 8 |
| 13 | 12 | 15 | 14 | 9 | 8 | 11 | 10 | 5 | 4 | 7 | 6 | 1 | 0 | 3 | 2 |

Phase Tiling Using Coset Hashing for 8 Levels

| | | | | | | | |
|---|---|---|---|---|---|---|---|
| 0 | 1 | 2 | 3 | 4 | 5 | 6 | 7 |
| 6 | 7 | 4 | 5 | 2 | 3 | 0 | 1 |
| 2 | 3 | 0 | 1 | 6 | 7 | 4 | 5 |
| 4 | 5 | 6 | 7 | 0 | 1 | 2 | 3 |

Phase Tiling Using Coset Hashing for 8 Levels

| | | | | | | | |
|---|---|---|---|---|---|---|---|
| 1 | 0 | 3 | 2 | 5 | 4 | 7 | 6 |
| 7 | 6 | 5 | 4 | 3 | 2 | 1 | 0 |
| 3 | 2 | 1 | 0 | 7 | 6 | 5 | 4 |
| 5 | 4 | 7 | 6 | 1 | 0 | 3 | 2 |

Phase Tiling Using Coset Hashing for 4 Levels

| | | | |
|---|---|---|---|
| 0 | 1 | 2 | 3 |
| 2 | 3 | 0 | 1 |
| 1 | 0 | 3 | 2 |
| 3 | 2 | 1 | 0 |

The weight decoders 60 of FIG. 2 are a simple array of conventional combinational decoders that produce single output values. It has been found that having an almost periodic weight decode sequence (shown in FIG. 8) produces stable gray levels without any visual shimmering effect. (The weight decode sequence is not exactly periodic to avoid the undesirable visual marquee or beading effects).

In accordance with the present invention there is no need to have the programmable matrix generator generate seed patterns, because the ordering of zero and one values in the final output sequence to the pixel drivers can be controlled by the weight decoders.

Coset hashing can be made programmable to generate phase tiling matrices. For 16 levels there are more than 4824 feasible tiling matrices, for eight levels there are 18 programmable tiling matrices, and for four levels there are six feasible matrices; however these six violate the diagonal adjacency rule. (It is impossible for the four level mode to not violate the diagonal adjacency rule using H matrices.) A 16-bit programmable register is sufficient to program tiling matrices for all levels.

This disclosure is illustrative and not limiting; further modifications will be apparent to one skilled in the art and are intended to fall within the scope of the invention as defined by the appended claims.

We claim:

1. A method for controlling pixel brightness levels for a digitally controlled display, comprising the steps of:

associating a duty cycle with each of a plurality of pixel brightness levels;

periodically generating a pattern by a matrix multiplication, the pattern defying a plurality of pixel phase shifts;

applying the pattern to assign one of the phase shifts to each pixel, for energizing the pixel at a particular duty cycle;

wherein the matrix multiplication includes;

matrix multiplying a matrix by itself p times; where p indicates a phase shift amount; and the step of applying includes;

for each phase shift, applying a pattern corresponding to the matrix multiplied by itself p times.

2. The method of claim 1, in which the step of periodically generating is programmable.

3. The method of claim 1, in which the generated pattern is repeated after n−1 phase shifts are generated, where n is a number of the pixel brightness levels.

4. The method of claim 1, wherein the matrix multiplication includes the step of:

multiplying a first matrix by a second matrix representing a set of programmable parameters to generate the pattern.

5. The method of claim 1, wherein the step of applying the pattern comprises the step of:

multiplying a first matrix representing the pattern by a second matrix representing a set of programmable parameters.

6. The method of claim 1, further comprising the steps of:

selecting a hashing matrix H to ensure that no two adjacent pixels have the same phase; and applying the hashing matrix H to the assigned phase shifts.

7. A controller for a digitally controlled display having a plurality of pixels, each pixel operating at a plurality of brightness levels determined by energizing each pixel for an associated duty cycle, the controller comprising:

a clocked pattern generator, wherein the pattern generator periodically outputs a pattern signal defining one of p phases;

clocked phase selection multiplexer coupled to receive each of the pattern signals and periodically select a single output pattern;

wherein each pattern is applied to a signal representing a brightness level for a pixel, thereby to define a phase shift for the pixel; and means for matrix multiplying a matrix by itself p times, where p indicates a phase shift amount for a pixel, and each applied pattern corresponds to the matrix multiplied by itself p times.

8. The controller of claim 7, further comprising a hashing element connected to a control terminal of the multiplexer, wherein the hashing element selects an output pattern such that no two adjacent pixels are in the same phase.

9. The controller of claim 7, wherein the pattern generator includes a plurality of exclusive-OR gates each having a plurality of input terminals, with each input terminal being connected to an output terminal of an AND gate, each AND gate having at least two input terminals respectively connected to a selector register and a source of a matrix value signal.

10. The controller of claim 7, wherein the controller generates and provides the selected patterns without use of pattern memory.

11. The controller of claim 7, further comprising:

means for matrix multiplying a matrix by itself p times, where p indicates a phase shift amount for a pixel, and each applied pattern corresponds to the matrix multiplied by itself p times.

* * * * *